(12) United States Patent
Toss

(10) Patent No.: US 8,833,421 B2
(45) Date of Patent: Sep. 16, 2014

(54) DEVICE FOR HOT GAS WELDING OF PLASTIC SHEETS

(75) Inventor: Ramon Toss, Alten-Busek (DE)

(73) Assignee: TOSS GmbH & Co. KG, Alten-Busek (DE)

( * ) Notice: Subject to any disclaimer, the term of this patent is extended or adjusted under 35 U.S.C. 154(b) by 121 days.

(21) Appl. No.: 13/452,410

(22) Filed: Apr. 20, 2012

(65) Prior Publication Data

US 2012/0267053 A1    Oct. 25, 2012

(30) Foreign Application Priority Data

Apr. 21, 2011    (DE) .......................... 10 2011 018 380

(51) Int. Cl.
*B32B 37/00*    (2006.01)
*B29C 65/10*    (2006.01)
*B29C 65/00*    (2006.01)

(52) U.S. Cl.
CPC ................. *B29C 65/10* (2013.01); *B29C 66/41* (2013.01); *B29C 66/81262* (2013.01)
USPC ........... 156/497; 156/359; 156/499; 392/379; 392/478

(58) Field of Classification Search
USPC ............. 156/82, 359, 497, 499; 392/379, 478
See application file for complete search history.

(56) References Cited

U.S. PATENT DOCUMENTS 4,929,299 A * 5/1990 Romagnoli .................... 156/466
6,134,387 A    10/2000 Toss \* cited by examiner

*Primary Examiner* — James Sells
(74) *Attorney, Agent, or Firm* — Marvin Petry; Stites & Harbison PLLC

(57) ABSTRACT

A device for welding plastic sheets using of hot gas heated in a tubular conduit through which an electric current flows. The device has at least one gas inlet and several gas outlet openings the electrical resistance of which changes depending on the temperature. At least one metal strip is electrically connected to the tubular conduit in the segment of the tubular conduit which is provided with the gas outlet openings in order to influence the temperature differences of the hot gas flows exiting the individual gas outlet openings. The segment of the tubular conduit provided with the gas outlet openings is located between two gas inlet openings which are arranged at an axial distance. At least one metal strip is attached in the central area of this segment of the tubular conduit.

7 Claims, 1 Drawing Sheet

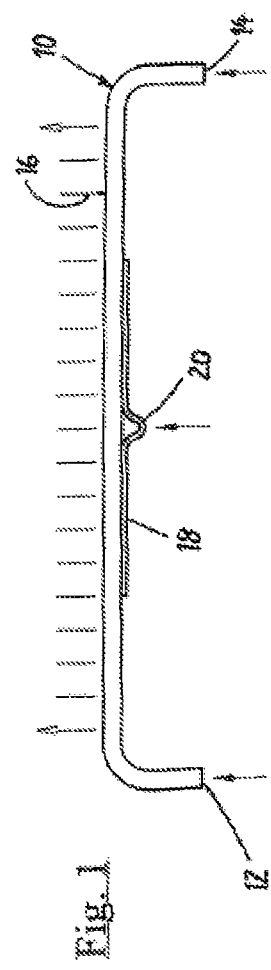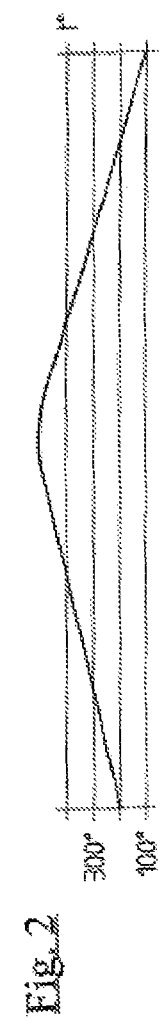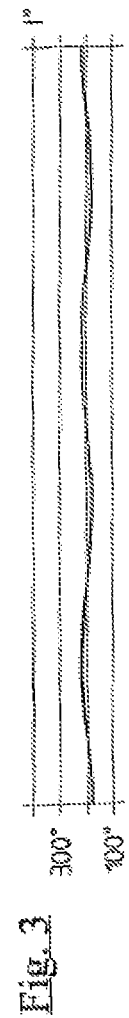
Fig. 1
Fig. 2
Fig. 3

DEVICE FOR HOT GAS WELDING OF PLASTIC SHEETS

The invention relates to a device for welding plastic sheets by means of hot gas, which is heated in a tubular conduit through which electric current flows, having at least one gas inlet and several gas outlet openings and whose resistance changes depending on the temperature.

Such a welding device has been described in EP 0 743 164 B1. It basically has the advantage that it operates with a good degree of efficiency and that the temperature of the hot gas can be precisely adjusted. This is, however, only applicable to the hot gas flow in general, or to its general temperature. More accurate observations of the hot gas flows exiting the individual gas outlet openings have, however, shown that the temperature of the hot gas exiting a gas outlet opening located farther away from a gas inlet opening is higher than that of the hot gas blown out through a gas outlet opening that is closer to a gas inlet. In a tubular conduit with a U-shaped longitudinal section, where both tube ends serve as a gas inlet and the gas outlet openings are distributed over the web of the U-shaped longitudinal section, the highest gas temperatures occur, for example, in the central area of the segment of the U-shaped tubular conduit provided with outlet openings. The lowest temperatures are measured next to the flanks of the U-shaped longitudinal section. The fact that the gas flows introduced through both ends into the tubular conduit collide in the central area of the web may also play a role in this case.

In order to homogenize the hot gas temperature along the tubular segment provided with gas outlet openings, it should be taken into consideration to provide gas outlet openings of different sizes and/or different tubular cross-sections, wall thickness and insulation. If, however, the pressure, the temperature and/or the flow velocity of the hot gas are modified owing to changes in the working conditions, for example, due to different ambient temperatures in summer and winter or due to different wall thicknesses and materials of the sheets to be welded, the values of the hole sizes and tubular cross sections previously optimized for a defined situation may no longer work optimally. It would then be very complicated to attempt to find a new optimum, for example, by changing the size of the hole and the cross section of the tubular conduit.

It is therefore an object of the invention to make available a cost-effective means for the purpose of adjusting the temperature of the partial flows of the hot gas with ease relative to one another.

The object mentioned above is attained by means of the invention by electrically connecting an electrically conductive material such as at least one metal strip to the tubular conduit in the segment of the tubular conduit provided with gas outlet openings in order to influence the temperature differences of the hot gas flows exiting the individual gas outlet openings. The metal strip enlarges the cross section of the conduit wall where it is attached in such a way that the electric resistance of the conduit wall is reduced in this area and the heating effect is consequently decreased. There is no problem in changing the size, shape and location on the conduit wall to ensure that a consistently uniform temperature distribution of the hot gas along the tubular heating device is obtained for the respectively prevailing situation.

In a preferred embodiment of the invention, the central part of the metal strip is shaped with a deflection that separates from the tubular conduit to balance differences in thermal expansion. Such a configuration is convenient if the metal strip is connected to the tubular conduit, for example, by means of soldering or welding. It could also be axially displaceably connected to the tubular conduit with an electrical contact. In this case, the metal strip can freely expand and contract, so that the deflection mentioned above is not necessary.

An exemplary embodiment of the invention will be explained below in more detail with reference to the drawings, wherein:

FIG. 1 shows a schematic lateral view of a tubular conduit used for welding plastic sheets having outlet openings for a hot gas heated in the tubular conduit;

FIG. 2 shows a schematic diagram of the distribution of the temperature of the hot gas along the tubular conduit according to FIG. 1, when this tubular conduit is used without the metal strip shown above; and FIG. 3 shows a diagram according to FIG. 2 of a more uniform distribution of the temperature of the hot gas utilizing the metal strip shown in FIG. 1.

FIG. 1 basically shows a U-shaped tubular conduit 10 made of a thermally conductive metal, whose inlet openings 12, 14 are connected at both ends to a blower, which blows air or another gas or gas mixture into the tubular conduit 10. The cross section of the tubular conduit 10 is round in the exemplary case. The outer diameter amounts to, for example, 5 mm, the wall thickness to 1 mm. The thermally conductive metal is preferentially stainless steel, whose electrical resistance changes in dependence upon the temperature, so that the temperature can be calculated by determining the resistance.

The U-shaped tubular conduit 10 has a plurality of outlet openings 16 in its straight web area, through which the air blown in can flow out at a defined distance onto a plastic sheet (not shown) guided along the tubular conduit. Electrical connectors (not shown) are attached to its legs in the region of the ends of the tube, which allow guiding electrical current at a low voltage, for example, approximately 10-40 volts, through the tubular conduit. It consequently heats up, so that the air flowing through it is also heated. The tubular conduit 10 should possibly be constantly kept at a defined temperature level in order to ensure uniform welding of the plastic sheets in dependence upon the geometry of the conduit, the material, the thickness and the feed rate of the plastic sheets to be welded.

This is possible owing to the function of the tubular conduit as a temperature sensor and electronic controls, which trace its resistance very precisely and thus its temperature and changes in temperature, and accordingly vary the current for the heating of the tubular conduit 10.

A tubular conduit closed on one end can also be used instead of the tubular conduit open at both ends or the conduit can also be configured as a closed circle with one or more lateral inlet openings in dependence upon the intended use. Slot widths or bore diameters of approximately 1 mm for the outlet openings 16, which are arranged at a distance of approximately 5 mm with respect to each other, but can also be differently spaced from each other in one direction, for example, at increasingly smaller distances, have proven especially suitable for packing machines.

The special feature of the tubular conduit 10 used as a welding tool is that an electrically conductive material such as a metal strip 18 is attached to the central area of the segment of the tubular conduit provided with gas outlet openings 16, for example, on the side opposite to the 18 gas outlet openings 16. It can be made from the same material as the tubular conduit 10 or of another electrically conductive material, and comes into contact with the tubular conduit 10 in such a way that an electrical connection exists between the metal strip 18 and the tubular conduit 10 in the contact area. It can be, for example, a soldered or welded connection. The web segment of the tubular conduit 10 can alternatively be provided with a longitudinal guide, which receives the metal strip and keeps it longitudinally displaceable. The metal strip 18 enlarges the cross-section of the tubular conduit 10 through which the current flows and consequently reduces the electrical resistance in the contact area, so that the tubular conduit 10 heats up less there than in the lateral segments of the tubular conduit next to the metal strip 18.

The effect of the metal strip 18 is shown in FIGS. 2 and 3. According to FIG. 2, the temperature of the hot gas noticeably increases toward the center of the tubular conduit 10, as disclosed in EP 0 743 164 B1. According to FIG. 3, this temperature increase can be prevented to a great extent by installing the metal strip 18 and the work can then be carried out at a substantially uniform temperature along the web of the tubular conduit 10.

As shown in FIG. 1, the metal strip 18 is shaped in its central part with a deflection 20 that separates from the tubular conduit 20 to balance differences in thermal expansion. The mechanical stress is reduced in this way.

The exemplary embodiment described above is based on the fact that a temperature peak should be reduced or prevented in the center of the tubular conduit 10. It goes without saying that metal strips 18 can also be used to deliberately generate an irregular temperature profile along the tubular conduit 10, for example, when only two layers of plastic sheets are to be welded together at one side of the welding tool, and three layers on the other side. The relatively high temperature required on the second side is then reached by reducing the temperature on the first side through a metal strip 18, making sure that a sufficient welding temperature is also reached on the other side where the metal strip 18 is by applying a higher current to the tubular conduit 10.

The invention claimed is:

1. A device for welding plastic sheets by hot gas heated in a tubular conduit through which an electric current flows, the conduit having at least one gas inlet and a segment which has several gas outlet openings, wherein the electrical resistance of the tubular conduit changes, depending on its temperature, an electrically conductive material electrically joined to the tubular conduit at a selected location or locations along the segment of the tubular conduit having the gas outlet openings, such that the electrical resistance of the portion or portions of the tubular conduit joined to the electrically conductive material has or have a lower electrical resistance, and therefore a lower temperature than the portion or portions of the tubular conduit not having an electrically conductive material join thereto.

2. A device according to claim 1, wherein the electrically conductive material is a metal strip.

3. The device according to claim 2, wherein the segment of the tubular conduit provided with the gas outlet openings is located between two gas inlet openings arranged at an axial distance and the at least one metal strip is attached in the central area of this segment of the tubular conduit.

4. The device according to claim 2, wherein the tubular conduit is bent in U-shape in the axial longitudinal section, the ends of the conduit form the gas inlet openings, the gas outlet openings are attached to the outer side of the web opposite the legs of the U-shaped tubular conduit that connects them, and the at least one metal strip is attached to its inner side.

5. The device according to claim 2, wherein the central part of the metal strip is shaped with a deflection that separates from the tubular conduit to balance differences in thermal expansion.

6. The device according to claim 2, wherein the material, the cross section, the length and the position of the metal strip are selected in such a way that the temperature differences of the hot gas flows exiting the individual gas outlet openings are minimized.

7. The device according to claim 2, wherein the metal strip is axially displaceably mounted on the tubular conduit.

\* \* \* \* \*